(12) United States Patent
Futagi et al.

(10) Patent No.: US 8,923,108 B2
(45) Date of Patent: *Dec. 30, 2014

(54) RADIO TRANSMISSION APPARATUS, AND RADIO TRANSMISSION METHOD

(71) Applicant: Panasosnic Intellectual Property Corporation of America, Torrance, CA (US)

(72) Inventors: Sadaki Futagi, Ishikawa (JP); Daichi Imamura, Beijing (CN); Atsushi Matsumoto, Ishikawa (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,969

(22) Filed: Oct. 18, 2013

(65) Prior Publication Data

US 2014/0044080 A1    Feb. 13, 2014

Related U.S. Application Data

(63) Continuation of application No. 13/789,358, filed on Mar. 7, 2013, now Pat. No. 8,619,619, which is a
(Continued)

(30) Foreign Application Priority Data

Sep. 30, 2005 (JP) ................................ 2005-288300

(51) Int. Cl.
*H04L 27/00* (2006.01)
*H04L 12/26* (2006.01)
(Continued)

(52) U.S. Cl.
CPC ............. *H04L 5/0058* (2013.01); *H04L 5/0007* (2013.01); *H04L 1/0004* (2013.01);
(Continued)

(58) Field of Classification Search
None
See application file for complete search history.

(56) References Cited

U.S. PATENT DOCUMENTS 8,149,727 B2 *   4/2012   Futagi et al. ................... 370/252
8,441,936 B2 *   5/2013   Futagi et al. ................... 370/236
(Continued)

FOREIGN PATENT DOCUMENTS

EP   1 505 756 A2   2/2005
EP   1 513 282 A2   3/2005
(Continued)

OTHER PUBLICATIONS

"3rd Generation Partnership Project; Technical Specification Group Radio Access Network; Physical channels and mapping of transport channels onto physical channels (FDD) (Release 6)," 3GPP TS 25.211 V6.5.0, Jun. 2005, pp. 1-49.

(Continued)

*Primary Examiner* — Omar Ghowrwal
(74) *Attorney, Agent, or Firm* — Seed IP Law Group PLLC

(57) ABSTRACT

Provided is a communication device, which is enabled to improve the throughput of a communication system by reducing the difference of a transmission power between an SCCH and an SDCH thereby to satisfy the required quality of a PAPR. In this device, an MCS selection unit (111) of a transmission unit (110) decides, with reference to a CQI lookup table, an MCS pattern (MCS1) of the SDCH, an MCS pattern (MCS2) of the SCCH and information (multiplex information) on multiplex positions on the time axes of those two channels, on the basis of the CQI information. On the basis of the MCS2 and the MCS1, encoding modulation units (112 and 113) perform encoding and modulating operations. According to the multiplex information, a channel multiplexing unit (114) time-division multiplexes the SCCH and the SDCH thereby to generate a transmission signal.

19 Claims, 13 Drawing Sheets

Related U.S. Application Data continuation of application No. 13/406,374, filed on Feb. 27, 2012, now Pat. No. 8,441,936, which is a continuation of application No. 12/088,641, filed as application No. PCT/JP2006/319550 on Sep. 29, 2006, now Pat. No. 8,149,727.

(51) Int. Cl.

| | | |
|---|---|---|
| *H04W 24/00* | (2009.01) | |
| *H04W 88/00* | (2009.01) | |
| *H04B 7/26* | (2006.01) | |
| *H04B 17/00* | (2006.01) | |
| *H04B 1/38* | (2006.01) | |
| *H04L 1/00* | (2006.01) | |
| *H04W 52/26* | (2009.01) | |
| *H04W 72/08* | (2009.01) | |
| *H04L 27/26* | (2006.01) | |
| *H04L 5/00* | (2006.01) | |

(52) U.S. Cl.
CPC ............. *H04L 1/0026* (2013.01); *H04L 5/006* (2013.01); *H04W 52/262* (2013.01); *H04L 1/0005* (2013.01); *H04W 72/08* (2013.01); *H04L 27/2614* (2013.01); *H04L 5/0046* (2013.01); *H04L 1/0009* (2013.01); *H04L 1/0016* (2013.01); *Y10S 370/914* (2013.01)
USPC ........... 370/203; 370/252; 370/310; 370/351; 370/914; 455/561

(56) References Cited

U.S. PATENT DOCUMENTS

| | | | |
|---|---|---|---|
| 8,619,619 B2* | 12/2013 | Futagi et al. ................. 370/252 |
| 2002/0137457 A1 | 9/2002 | Nivens et al. |
| 2003/0008683 A1 | 1/2003 | Nanao et al. |
| 2003/0083088 A1 | 5/2003 | Chang et al. |
| 2004/0001472 A1 | 1/2004 | Kwak et al. |
| 2004/0219883 A1 | 11/2004 | Pauli et al. |
| 2005/0099992 A1 | 5/2005 | Sato |
| 2005/0164644 A1 | 7/2005 | Shinoi et al. |
| 2005/0208973 A1 | 9/2005 | Iochi |
| 2005/0229073 A1 | 10/2005 | Sudo |
| 2006/0256809 A1* | 11/2006 | May ............................. 370/465 |
| 2007/0061577 A1* | 3/2007 | Van De Kerkhof et al. .. 713/176 |
| 2008/0123601 A1 | 5/2008 | Malladi et al. |
| 2008/0253404 A1 | 10/2008 | Lampin et al. |
| 2010/0185777 A1 | 7/2010 | Kim et al. |
| 2012/0155519 A1 | 6/2012 | Futagi et al. |

FOREIGN PATENT DOCUMENTS

| | | |
|---|---|---|
| JP | 2003-174485 A | 6/2003 |
| JP | 2004-153640 A | 5/2004 |
| JP | 2004-1730193 A | 6/2004 |
| RU | 2003 125 611 A | 2/2005 |
| WO | 99/12281 A1 | 3/1999 |

OTHER PUBLICATIONS

Drafting Group 1 (DL OFDM, UL SC-FDMA), "Text Proposal: Principles for the Evolved UTRA," TSG-RAN WG1 Ad Hoc on LTE, R1-050679, Agenda Item: 5, Sophia Antipolis, France, Jun. 20-21, 2005, 7 pages.

English Language Translation of Russian Office Action, dated Jun. 24, 2010, related to Russian Patent Application No. 2008112140/09 (013127), 2 pages.

Extended European Search Report, dated Jul. 9, 2013, for corresponding European Application No. 13171115.2-1860, 8 pages.

Extended European Search Report, dated Jul. 9, 2013, for corresponding European Application No. 13171117.8-1860, 8 pages.

Hwang et al., "Clarification of H-ARQ Operation with Reduced AAS Private Map," IEEE C802. 16e-05/071, Jan. 11, 2005, 5 pages.

International Search Report, dated Oct. 31, 2006.

NTT DoCoMo, Fujitsu, NEC, "CQI-based Transmission Power Control for Control Channel in Evolved UTRA," R1-050852, Agenda Item: 10.3, 3GPP TSG RAN WG1 #42 on LTE, London, UK, Aug. 29-Sep. 2, 2005, 6 pages.

Russian Office Action dated Jun. 24, 2010, related to Russian Patent Application No. 2008112140/09 (013127), 4 pages.

* cited by examiner

FIG.5

| CQI | SDCH | | | SCCH | | | MULTIPLEXING INFORMATION |
|---|---|---|---|---|---|---|---|
| | Modulation | CodingRate | RF | Modulation | CodingRate | RF | |
| 1 | BPSK | 1/3 | 8 | BPSK | 1/3 | 32 | A |
| 2 | BPSK | 1/3 | 4 | BPSK | 1/3 | 16 | B |
| 3 | BPSK | 1/3 | 2 | BPSK | 1/3 | 8 | C |
| 4 | BPSK | 1/3 | 1 | BPSK | 1/3 | 4 | D |
| 5 | QPSK | 1/3 | 1 | BPSK | 1/3 | 2 | E |
| 6 | QPSK | 1/2 | 1 | BPSK | 1/3 | 1 | F |
| 7 | QPSK | 3/4 | 1 | QPSK | 1/2 | 1 | G |
| 8 | QPSK | 5/6 | 1 | QPSK | 2/3 | 1 | H |
| 9 | 16QAM | 1/3 | 1 | QPSK | 3/4 | 1 | I |
| 10 | 16QAM | 1/2 | 1 | QPSK | 5/6 | 1 | J |
| 11 | 16QAM | 3/4 | 1 | QPSK | | | K |
| 12 | 16QAM | 5/6 | 1 | QPSK | 7/8 | 1 | L |
| 13 | 64QAM | 1/3 | 1 | QPSK | | | M |
| 14 | 64QAM | 1/2 | 1 | QPSK | | | N |
| 15 | 64QAM | 3/4 | 1 | QPSK | | | O |
| 16 | 64QAM | 5/6 | 1 | QPSK | | | P |

| CQI | SDCH ||| SCCH |||| POWER DIFFERENCE | TRANSMISSION POWER | MULTIPLEXING INFORMATION |
| --- | --- | --- | --- | --- | --- | --- | --- | --- | --- |
| | Modulation | CodingRate | RF | Modulation | CodingRate | RF | | | |
| 1 | BPSK | 1/3 | 8 | BPSK | 1/3 | 32 | 0dB | 27dBm | A |
| 2 | BPSK | 1/3 | 4 | BPSK | 1/3 | 16 | | | B |
| 3 | BPSK | 1/3 | 2 | BPSK | 1/3 | 8 | | | C |
| 4 | BPSK | 1/3 | 1 | BPSK | 1/3 | 4 | | | D |
| 5 | QPSK | 1/3 | 1 | BPSK | 1/3 | 2 | 0.5dB | | E |
| 6 | QPSK | 1/2 | 1 | BPSK | 1/3 | 1 | | | F |
| 7 | QPSK | 3/4 | 1 | QPSK | 1/3 | 1 | 0dB | | G |
| 8 | QPSK | 5/6 | 1 | QPSK | 1/2 | 1 | | | H |
| 9 | 16QAM | 1/3 | 1 | QPSK | 2/3 | 1 | 1dB | | I |
| 10 | 16QAM | 1/2 | 1 | QPSK | 3/4 | 1 | | | J |
| 11 | 16QAM | 3/4 | 1 | QPSK | 5/6 | 1 | | | K |
| 12 | 16QAM | 5/6 | 1 | QPSK | 7/8 | | 1.5dB | 26dBm | L |
| 13 | 64QAM | 1/3 | 1 | | | | 2dB | 25dBm | M |
| 14 | 64QAM | 1/2 | 1 | | | | 2.5dB | 24dBm | N |
| 15 | 64QAM | 3/4 | 1 | | | | 3dB | 23dBm | O |
| 16 | 64QAM | 5/6 | 1 | | | | 3.5dB | 22dBm | P |

FIG.9

| CQI | SDCH | | | SCCH | | | MULTIPLEXING INFORMATION |
|---|---|---|---|---|---|---|---|
| | Modulation | CodingRate | RF | Modulation | CodingRate | RF | |
| 1 | BPSK | 1/3 | 8 | BPSK | 1/3 | 32 | A |
| 2 | BPSK | 1/3 | 4 | BPSK | 1/3 | 16 | B |
| 3 | BPSK | 1/3 | 2 | BPSK | 1/3 | 8 | C |
| 4 | BPSK | 1/3 | 1 | BPSK | 1/3 | 4 | D |
| 5 | QPSK | 1/3 | 1 | BPSK | 1/3 | 2 | E |
| 6 | QPSK | 1/2 | 1 | BPSK | 1/3 | 1 | F |
| 7 | QPSK | 3/4 | 1 | QPSK | 1/3 | 1 | G |
| 8 | QPSK | 5/6 | 1 | QPSK | 1/2 | 1 | H |
| 9 | 16QAM | 1/3 | 1 | QPSK | 2/3 | 1 | I |
| 10 | 16QAM | 1/2 | 1 | QPSK | 3/4 | 1 | J |
| 11 | 16QAM | 3/4 | 1 | QPSK | 5/6 | 1 | K |
| 12 | 16QAM | 5/6 | 1 | | | | L |
| 13 | 64QAM | 1/3 | 1 | QPSK | 7/8 | 1 | M |
| 14 | 64QAM | 1/2 | 1 | | | | N |
| 15 | 64QAM | 3/4 | 1 | | | | O |
| 16 | 64QAM | 5/6 | 1 | | | | P |

FIG.14

RADIO TRANSMISSION APPARATUS, AND RADIO TRANSMISSION METHOD

TECHNICAL FIELD

The present invention relates to a radio transmitting apparatus and radio transmission method used in a communication system employing an adaptive modulation scheme.

BACKGROUND ART

Currently, in uplink of 3GPP RAN LTE (Long Term Evolution), to realize a low PAPR (Peak to Average Power Ratio), attention is focused on single carrier transmission. Further, a scheme is studied of selecting an MCS (Modulation and Coding Scheme) pattern per user according to a CQI (Channel Quality Indicator) of the user and performing adaptive modulation and coding (AMC) to obtain high throughput (for example, see Non-Patent Document 1).

Further, to perform adaptive modulation and coding, a technique is known of multiplexing a control channel required for decoding a data channel with the data channel and transmitting the multiplexed channel (for example, see Non-Patent Document 2). Non-Patent Document 2 defines an SDCH (Scheduled Data Channel) as a data channel and defines an SCCH (Scheduled Control Channel) as a control channel.

Non-Patent Document 1: 3GPP TS25.211 v6.5.0, June, 2005

Non-Patent Document 2: 3GPP TSG RAN1 R1-050679, June 2005

DISCLOSURE OF INVENTION

Problems to be Solved by the Invention

To focus on a subframe format studied in 3GPP RAN LTE, when a plurality of channels such as an SCCH and SDCH are multiplexed, a possible frame configuration is where a pilot channel is on an SB (Short Block) and the SCCH and SDCH are time division multiplexed on an LB (Long Block). FIGS. 1 and 2 show specific examples of frame configurations where the SCCH and SDCH are time division multiplexed.

FIGS. 1 and 2 also show transmission power of the SCCH and SDCH. As shown in these figures, cases occur where the difference of transmission power between the SCCH and the SDCH increases due to the following reasons.

As the MCS for the SCCH, a spreading factor, modulation scheme and coding rate where the required CNR is low, is commonly used by all users such that even a user in a poor reception environment can satisfy required quality. That is, in 3GPP RAN LTE, adaptive modulation and coding is performed, and so the MCS pattern for the SDCH changes variously, while the MCS pattern for the SCCH (not including transmission power) is fixed.

However, to reduce level fluctuation errors due to fading and ensure required quality of the SCCH, the transmission power for the SCCH is controlled such that the transmission power is changed per user according to the received power of each user.

That is, the transmission power for the SCCH changes through the transmission power control, while the transmission power for the SDCH changes through adaptive modulation and coding, and therefore the transmission power for the SCCH and the transmission power for the SDCH change independently from each other. Therefore, as shown in FIG. 1, the transmission power for the SCCH may be higher than the transmission power for the SDCH, or, as shown in FIG. 2, the transmission power for the SCCH may be lower than the transmission power for the SDCH.

In both cases, the difference of transmission power between the SCCH and the SDCH becomes large. Consequently, the PAPR for the transmission signal including these two channels shows a high value, and so it is necessary to provide enough back-off of the transmission amplifier and decrease total transmission power upon transmission so as not to cause distortion in the transmission signal. As a result, the required quality of these two channels cannot be satisfied and communication system throughput decreases.

It is therefore an object of the present invention to provide a radio transmitting apparatus and radio transmission method capable of improving communication system throughput by making the difference of transmission power between the SCCH and the SDCH small, suppressing an increase of the PAPR, and making it easier to satisfy required quality of the two channels.

Means for Solving the Problem

The radio transmitting apparatus of the present invention determines an MCS of the transmission signal based on a CQI reported from a communicating party and adopts a configuration including: a determining section that determines an MCS for a data channel based on the CQI reported from the communicating party and determines an MCS for a control channel based on the same CQI; and a transmitting section that transmits the transmission signal including the data channel and the control channel.

Advantageous Effect of the Invention

According to the present invention, it is possible to suppress an increase of the PAPR, make it easier to satisfy required quality of the two channels and improve communication system throughput.

BRIEF DESCRIPTION OF DRAWINGS

FIG. 5 shows an example of content of a CQI look-up table according to Embodiment 1;

FIG. 9 shows an example of content of a CQI look-up table according to Embodiment 2;

FIG. 14 specifically illustrates how a CQI is actually corrected by the CQI offset command.

BEST MODE FOR CARRYING OUT THE INVENTION

Embodiments of the present invention will be described in detail below with reference to the accompanying drawings. Here, a case will be described where the DFT-s-OFDM (Discrete Fourier Transform-Spread-Orthogonal Frequency Division Multiplex) scheme, that is, a single carrier communication scheme is employed as a communication scheme.

Embodiment 1

Figure 1:
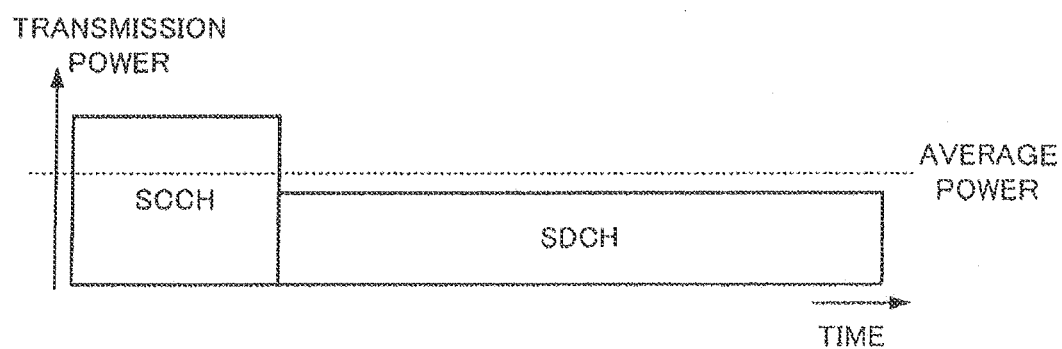
FIG. 1 shows a specific example of a frame configuration where an SCCH and an SDCH are time division multiplexed.
Figure 2:
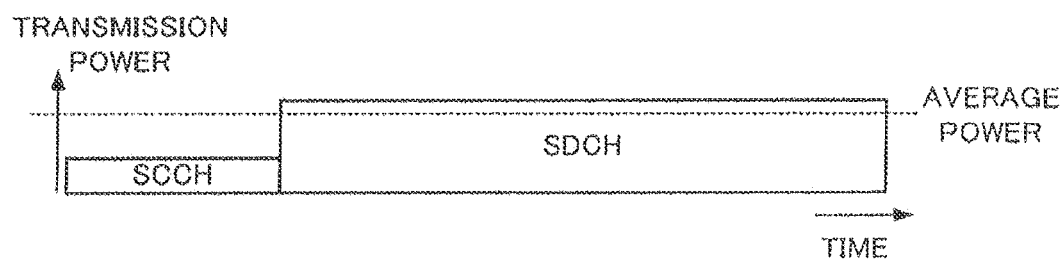
FIG. 2 shows another specific example of the frame configuration where the SCCH and the SDCH are time division multiplexed.
Figure 3:
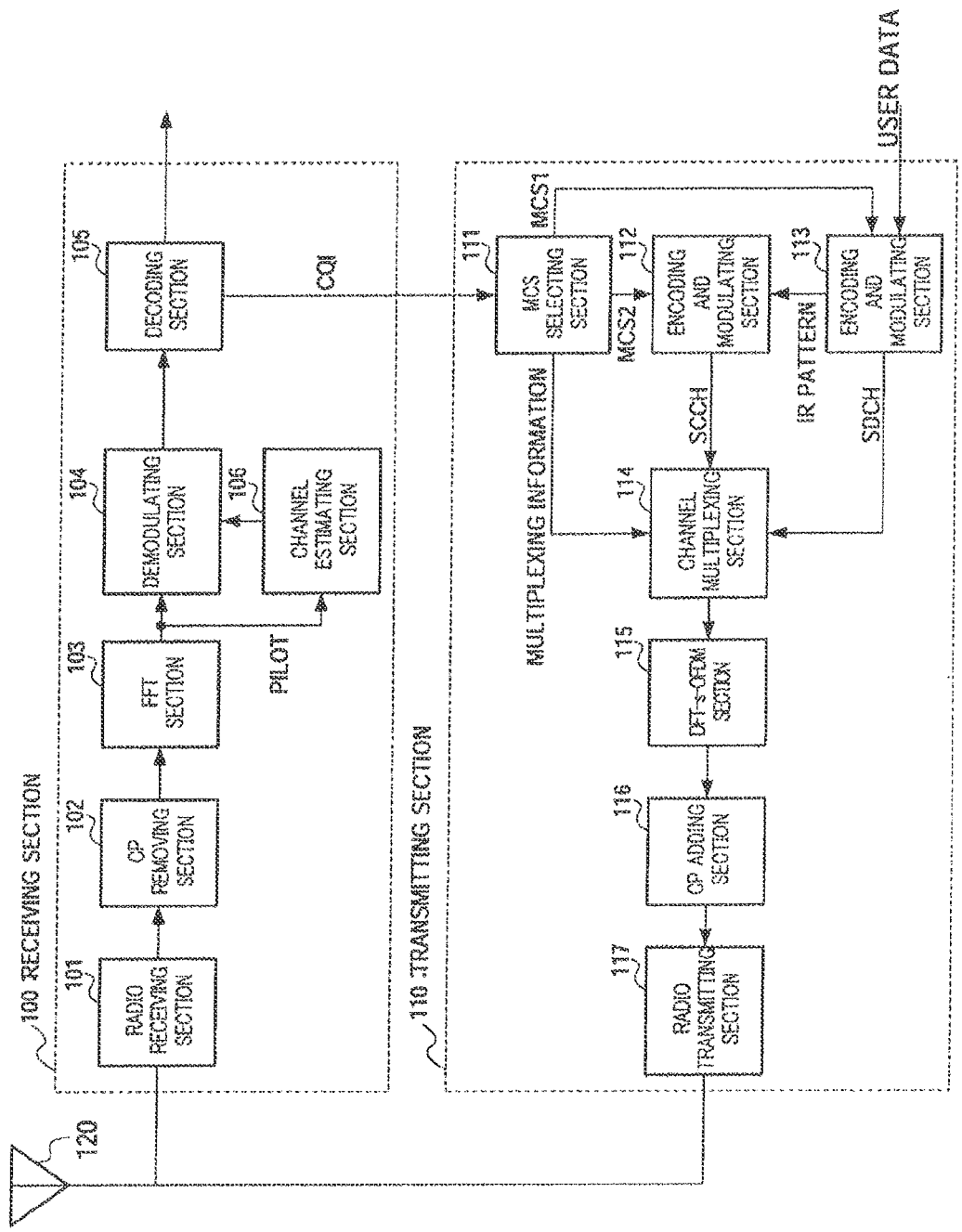
FIG. 3 is a block diagram showing a main configuration of a communication apparatus according to Embodiment 1.

FIG. 3 is a block diagram showing a main configuration of a communication apparatus provided with a radio transmitting apparatus according to Embodiment 1 of the present invention.

This communication apparatus is mainly configured with receiving section 100 and transmitting section 110. Receiving section 100 has radio receiving section 101, CP removing section 102, FFT section 103, demodulating section 104, decoding section 105 and channel estimating section 106, and transmitting section 110 has MCS selecting section 111, encoding and modulating sections 112 and 113, channel multiplexing section 114, DFT-s-OFDM section 115, CP adding section 116 and radio transmitting section 117.

The sections of the above-described communication apparatus perform the following operations.

Radio receiving section 101 of receiving section 100 converts the signal received through antenna 120 to a baseband signal and outputs the baseband signal to CP removing section 102. CP removing section 102 performs processing of removing a CP (Cyclic Prefix) part of the baseband signal outputted from radio receiving section 101, and outputs the obtained signal to FFT section 103. FFT section 103 performs a fast Fourier transform (FFT) on the time domain signal outputted from CP removing section 102, and outputs the obtained frequency domain signal to demodulating section 104 and channel estimating section 106. Channel estimating section 106 estimates channel environment of the received signal using a pilot signal included in the signal outputted from FFT section 103, and outputs the estimated result to demodulating section 104. Demodulating section 104 performs channel compensation on a signal where control information such as a pilot signal is removed (data information) out of the received signal subjected to the Fourier transform processing at FFT section 103, based on the estimated result of the channel environment outputted from channel estimating section 106. Further, demodulating section 104 performs demodulating processing on the signal subjected to channel compensation based on the same MCS as used in the radio transmitting apparatus, that is, the same modulation scheme, coding rate, and the like as the radio transmitting apparatus, and outputs the result to decoding section 105. Decoding section 105 performs error correction on the demodulated signal and extracts an information data sequence and CQI information from the received signal. The CQI information is outputted to MCS selecting section 111.

In the meantime, MCS selecting section 111 of transmitting section 110 determines the MCS pattern of an SDCH (MCS 1), the MCS pattern of an SCCH (MCS 2) and information relating to the multiplexing position of these two channels in the time domain (multiplexing information), based on the CQI information outputted from decoding section 105 with reference to a CQI look-up table described later. MCS 1 is outputted to encoding and modulating section 113, MCS 2 is outputted to encoding and modulating section 112, and the multiplexing information is outputted to channel multiplexing section 114.

Encoding and modulating section 113 performs encoding and modulating processing on inputted user data (transmission data sequence) based on the MCS pattern (MCS 1) outputted from MCS selecting section 111, and generates transmission data for the SDCH and an IR pattern used upon encoding. The transmission data for the SDCH is outputted to channel multiplexing section 114, and the IR pattern is outputted to encoding and modulating section 112.

Encoding and modulating section 112 performs encoding and modulating processing on control information such as the IR pattern outputted from encoding and modulating section 113, based on the MCS pattern outputted from MCS selecting section 111, and generates transmission data for the SCCH. The generated transmission data for the SCCH is outputted to channel multiplexing section 114.

Channel multiplexing section 114 time-division multiplexes the transmission data for the SCCH and SDCH outputted from encoding and modulating sections 112 and 113 according to the multiplexing information outputted from MCS selecting section 111. The multiplexed transmission data is outputted to DFT-s-OFDM section 115.

DFT-s-OFDM section 115 performs a discrete Fourier transform (DFT) on the transmission data outputted from channel multiplexing section 114, performs time-frequency conversion on time-series data, and obtains a frequency domain signal. After mapping the frequency domain signal on transmission subcarriers, DFT-s-OFDM section 115 performs inverse fast Fourier transform (IFFT) processing and converts the frequency domain signal to a time domain signal. The obtained time domain signal is outputted to CP adding section 116.

CP adding section 116 adds a CP per transmission data block by duplicating data at the tail of a block per transmission data block outputted from DFT-s-OFDM section 115 and inserting the duplicated data into the beginning of the block, and outputs the result to radio transmitting section 117.

Radio transmitting section 117 converts the baseband signal outputted from CP adding section 116 to a radio frequency band, and transmits the result through antenna 120.

Figure 4:
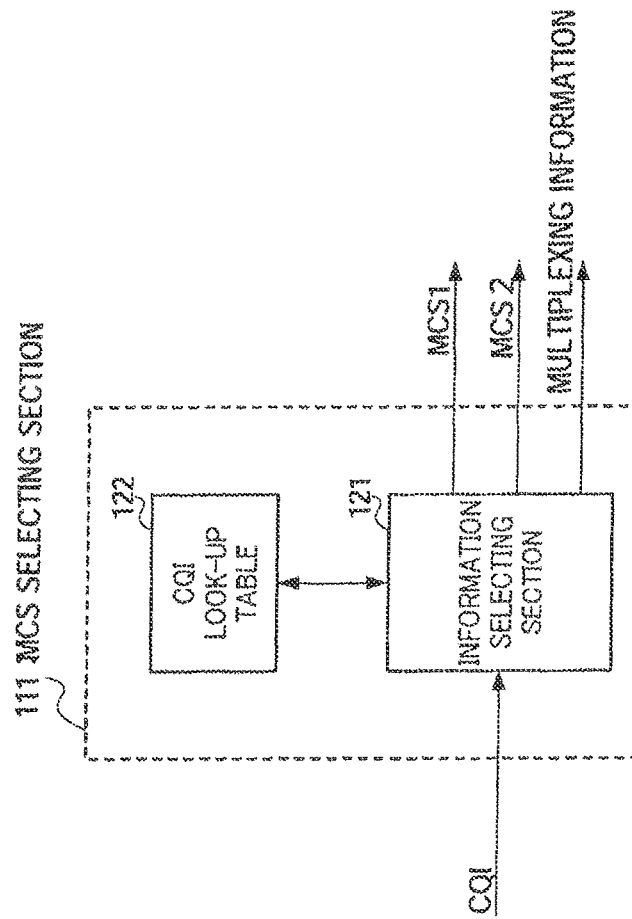
FIG. 4 is a block diagram showing a main internal configuration of an MCS selecting section according to Embodiment 1.

FIG. 4 is a block diagram showing the main internal configuration of MCS selecting section 111. Information selecting section 121 determines MCS 1 for the SDCH, MCS 2 for the SCCH and multiplexing information based on the inputted CQI with reference to CQI look-up table 122 shown in FIG. 5.

FIG. 5 shows an example of content of CQI look-up table 122 as described above. Here, a case will be described as an example where modulation schemes of BPSK (Binary Phase Shift Keying), QPSK (Quadrature Phase Shift Keying) 16 QAM (Quadrature Amplitude Modulation) and 64 QAM are employed, coding rates of 1/3, 1/2, 2/3, 3/4, 5/6 and 7/8 are employed, and, only for BPSK, repetition factors (RFs) of 1, 2, 4, 8, 16 and 32 are employed.

For example, when CQI=7, information selecting section 121 selects a modulation scheme of QPSK, a coding rate of ¾ and a repetition factor of 1 for the SDCH with reference to CQI look-up table 122, and outputs these collectively as MCS 1. Further, information selecting section 121 uses the same CQI=7, selects a modulation scheme of QPSK, a coding rate of ⅓ and a repetition factor of 1 matching CQI=7 for the SCCH, and outputs these as MCS 2. In this way, from FIG. 5, how MCS 1 for the SDCH and MCS 2 for the SCCH are set in association with each other for each CQI, can be understood.

In this CQI look-up table 122, MCS 2 for the SCCH is set using the following method according to MCS 1 for the SDCH set on a per CQI basis.

First, the MCS for the SDCH is determined for each CQI. Next, an average transmission rate of the SDCH is calculated per CQI, and the MCS for the SCCH is determined using the following determination method. That is, by assuming that the average transmission rate of the SDCH is A, the number of symbols of the SDCH is B, the PER (Packet Error Rate) when MCS 1 (for example, QPSK and R=½) is selected for the SCCH is C, the PER when MCS 2 (for example, QPSK and R=⅓) is selected for the SCCH is D, and the difference between the number of symbols of the SCCH (MCS 1) and the number of symbols of the SCCH (MCS 2) is E, and, by comparing "A×(1−C)" with "A×(1−D)×(E+B)/B," the MCS having the greater value, that is the MCS having the higher transmission rate is made the MCS for the SCCH. In addition, both (1−C) and (1−D) represent a rate of SDCH transmission rate decrease due to SCCH reception errors, and (E+B)/B represents a rate of SDCH transmission rate increase when SCCH resources are made SDCH resources.

In other words, in CQI look-up table 122, MCS 1 and MCS 2 are set such that the PAPRs for the SCCH and SDCH remain within the range of the assumed PAPR and a transmission rate of the SCCH and SDCH becomes a maximum.

Figure 6:
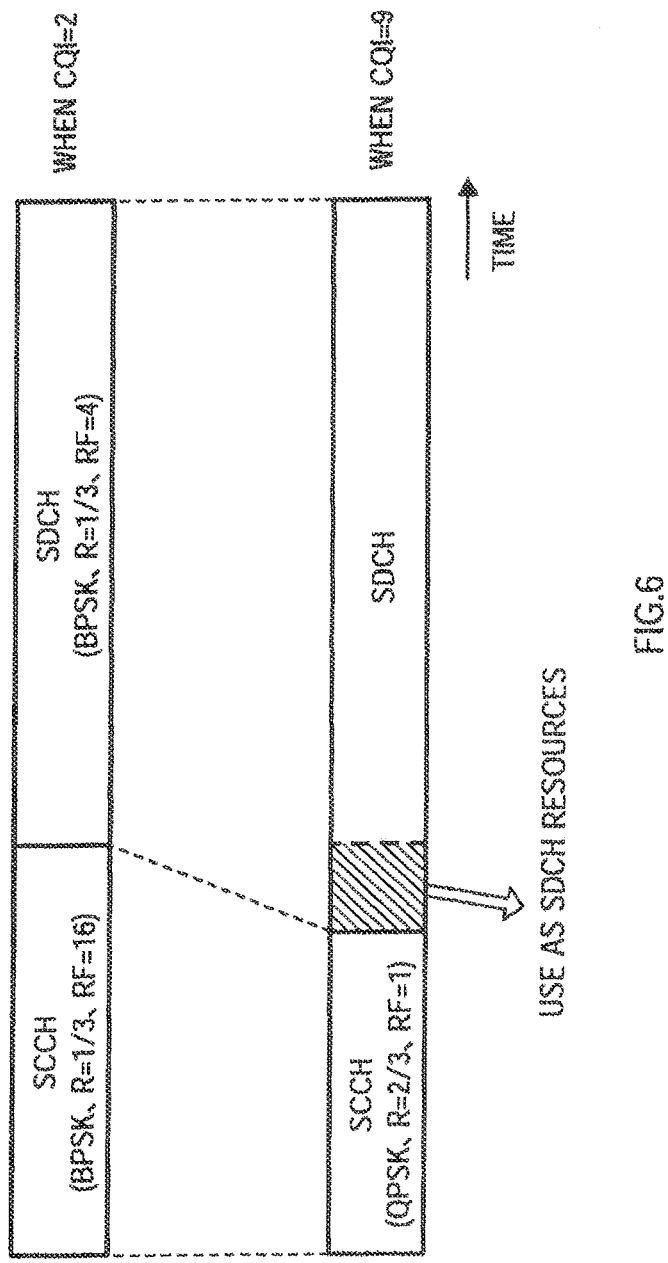
FIG. 6 shows an example of a frame format of a transmission signal where an SCCH and an SDCH are multiplexed.

Further, in FIG. 5, multiplexing information A to P is information as described below. FIG. 6 shows an example of a frame format of a transmission signal where an SCCH and an SDCH are multiplexed.

This figure shows a frame format of the transmission signal when the CQI is different, for example, a transmission signal when the CQI is 2, shown in the upper part, and a transmission signal when the CQI is 9, shown in the lower part. In this way, when the SCCH is mapped at the beginning and the SDCH is mapped following the SCCH, the number of transmission data for the SCCH, that is, the number of SCCH symbols, changes according to CQIs, and so the starting position of the SDCH changes. Therefore, in this embodiment, a plurality of types of information showing the starting position of the SDCH are set by CQI look-up table 122 as information (multiplexing information) relating to the multiplexing position of the two channels in the time domain. Channel multiplexing section 114 acquires multiplexing information for each CQI set in CQI look-up table 122 through information selecting section 122 in MCS selecting section 111, and multiplexes the SCCH and the SDCH using this multiplexing information.

Here, the information amount before encoding which is transmitted using the SCCH, is a fixed rate regardless of the MCS for the SDCH. Therefore, particularly, when the CQI is high, more SCCH transmission symbols after encoding and modulation can be reduced than the case where the CQI is low, and the SCCH symbol resources can be used as SDCH symbol resources (resources of a diagonal part in FIG. 6), so that it is possible to further improve SDCH throughput.

In addition, CQI look-up table 122 is also provided to a radio receiving apparatus supporting the radio transmitting apparatus according to this embodiment, and so the information set in CQI look-up table 122 is known between the transmitting side and the receiving side.

In this way, according to this embodiment, in single carrier transmission where a plurality of channels are multiplexed, the MCS pattern for each channel is set in a CQI table (CQI look-up table 122) according to CQIs such that the difference of transmission power between the SCCH and the SDCH remains within a predetermined range. The radio transmitting apparatus according to this embodiment acquires MCS patterns for channels of the SCCH and the SDCH according to CQIs with reference to this CQI table, performs adaptive modulation and coding based on these MCS patterns and generates a transmission signal. By this means, it is possible to maintain a low PAPR of the transmission signal, and so it is more likely to satisfy required quality of the two channels. That is, it is possible to improve communication system throughput.

Further, according to this embodiment, by changing the MCS pattern for the SCCH, the required quality for the SCCH is more likely to be satisfied, so that transmission power control is not required in the SCCH. Transmission power does not fluctuate independently from each other among a plurality of channels. Therefore, by maintaining a low PAPR, the two channels are more likely to satisfy the required quality, so that it is possible to improve communication system throughput.

Further, according to this embodiment, the SCCH and the SDCH are set in the same CQI table so as to correspond to the same CQI, and this CQI table is shared between the transmitting side and the receiving side. By this means, the radio receiving apparatus supporting the radio transmitting apparatus according to this embodiment can acquire information relating to the MCS for the SCCH with reference to the CQI table shared between the transmitting side and the receiving side based on the reported CQI, and does not need to separately acquire information relating to the MCS for the SCCH from the radio transmitting apparatus according to this embodiment. That is, new signaling is not required.

In this embodiment, the SCCH and the SDCH are shown as examples of a plurality of channels subjected to time division multiplexing, but the channels the present invention is directed to are not limited to these, and, for example, the present invention may also be directed to three or more channels having different required quality or may be directed to channels employing different coding schemes. Further, an example has been described where time division multiplexing is performed on the SCCH, followed by the SDCH, but this is by no means limiting, and, for example, time division multiplexing is performed on the SDCH, followed by the SCCH.

Still further, a case has been described with this embodiment where CQI look-up table 122 is structured such that different MCS patterns and the like are set for different CQIs, but CQI look-up table 122 may be structured such that the same MCS pattern is set for different CQIs.

Further, CQI look-up table 122 may be structured such that different MCS patterns are set per bandwidth to be used.

Further, in this embodiment, CQI look-up table 122 may be structured such that the SCCH and the SDCH are interleaved in a sub-frame in the time domain.

Still further, in this embodiment, CQI look-up table 122 may be structured such that the above-described MCS and the like are added and the number of pilot symbols and the multiplexing position of this pilot are set.

Embodiment 2

Figure 7:
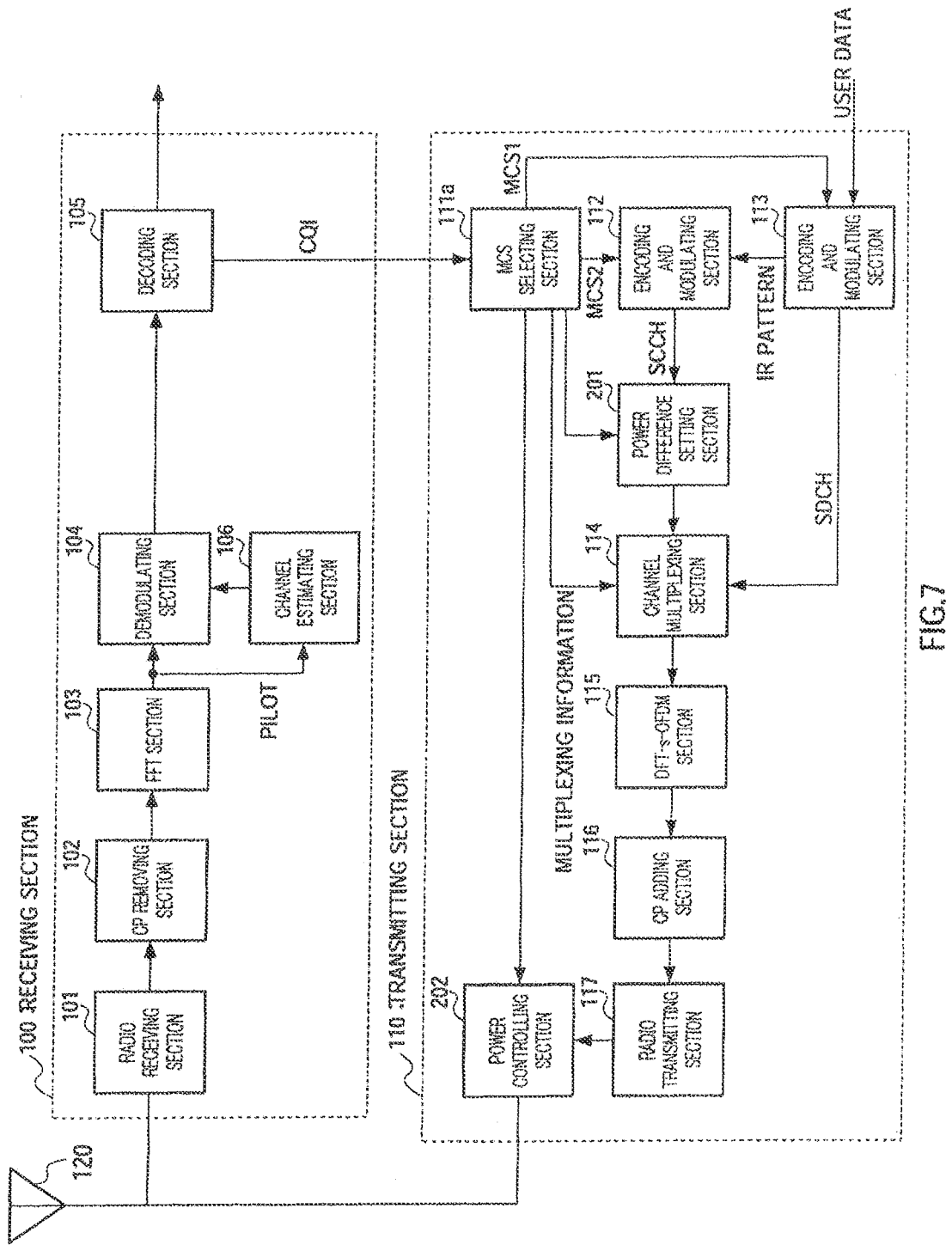
FIG. 7 is a block diagram showing a main configuration of a communication apparatus according to Embodiment 2.

FIG. 7 is a block diagram showing the main configuration of the communication apparatus provided with the radio transmitting apparatus according to Embodiment 2 of the present invention. This communication apparatus has a basic configuration similar to the communication apparatus described in Embodiment 1 (see FIG. 3), and the same components will be assigned the same reference numerals without further explanations.

The communication apparatus according to this embodiment further has power difference setting section 201 and power controlling section 202, and the transmission power of the SCCH is controlled. However, predetermined limits are placed on the difference of transmission power between the SCCH and the SDCH, and so transmission power can satisfy the required PAPR even if the transmission power is controlled. This is different from Embodiment 1.

Figure 8:
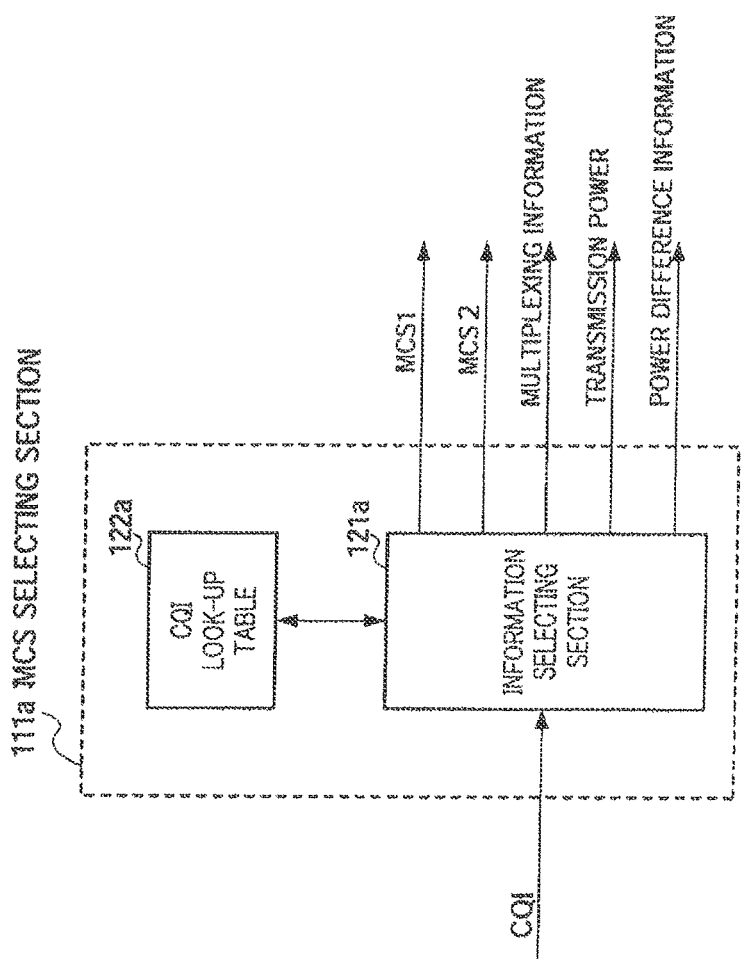
FIG. 8 is a block diagram showing a main internal configuration of an MCS selecting section according to Embodiment 2.

FIG. 8 is a block diagram showing the main internal configuration of MCS selecting section 111a.

MCS selecting section 111a performs the same basic operations as MCS selecting section 111 described in Embodiment 1, but is different from Embodiment 1 in that MCS selecting section 111a outputs (the setting value of) transmission power and transmission power difference information in addition to information of MCS 1 for the SDCH and the like. Therefore, the same reference numerals as MCS selecting section 111 are assigned, and, to distinguish the MCS selecting section from Embodiment 1, the letter "a" is assigned to the reference numeral 111. To other components, letters are added for the same reason.

FIG. 9 shows an example of content of CQI look-up table 122a.

In CQI look-up table 122a, when the CQI level remains within the range of 1 to 8, that is, when the CQI level is low, transmission power is set with the same value of 27 dB. On the other hand, when the CQI level remains within the range of 9 to 16, that is, when the CQI level is high, the transmission power is set with different values of 19 to 26 dB, according to the CQI level.

Further, the transmission power difference is set with 0 dB when the modulation scheme for the SDCH and the modulation scheme for the SCCH are the same, that is, the transmission power for the both channels is set with the same value. On the other hand, when the modulation scheme for the SDCH is different from the modulation scheme for the SCCH, the transmission power difference is set with values other than 0 dB. Here, although the transmission power difference is set with values other than 0 dB, the value is not unlimited, and values which have the range within 0.5 to 3.5 dB and which satisfy the following conditions are set. The reasons for this include, if modulation schemes are different, PAPRs become different in principle, and so, when the modulation scheme for the SDCH is different from the modulation scheme for the SCCH, even if the difference of PAPR in principle is set as a power difference, the overall PAPR does not increase, and throughput of the channel using the modulation scheme having the lower PAPR can be improved.

Further, when CQI=16, for example, the modulation scheme for the SDCH is 64 QAM, while the modulation scheme for the SCCH is QPSK, and there is a great difference in transmission rate and error robustness (which have a trade-off relationship) between these two modulation schemes. In this case, when the transmission power for the SDCH having low error robustness is set low by transmission power control, the PAPR may increase to an extent which does not cause distortion by a transmission amplifier, and the transmission power difference is set a maximum of 3.5 dB, such that transmission power for the SCCH having high error robustness is set as high as possible to make SCCH errors less likely.

In this way, according to this embodiment, when the modulation schemes for a plurality of channels are different, the transmission power difference is set per channel so as not to increase the PAPR. By this means, when there is some PAPR difference among the plurality of channels, it is possible to maintain a low PAPR and improve throughput for each channel.

Further, according to this embodiment, when the CQI level is low, transmission power is set with a constant value. That is, when the CQI level is low, transmission power control is not performed. By this means, it is possible to maintain a low PAPR and improve throughput for each channel.

Embodiment 3

Figure 10:
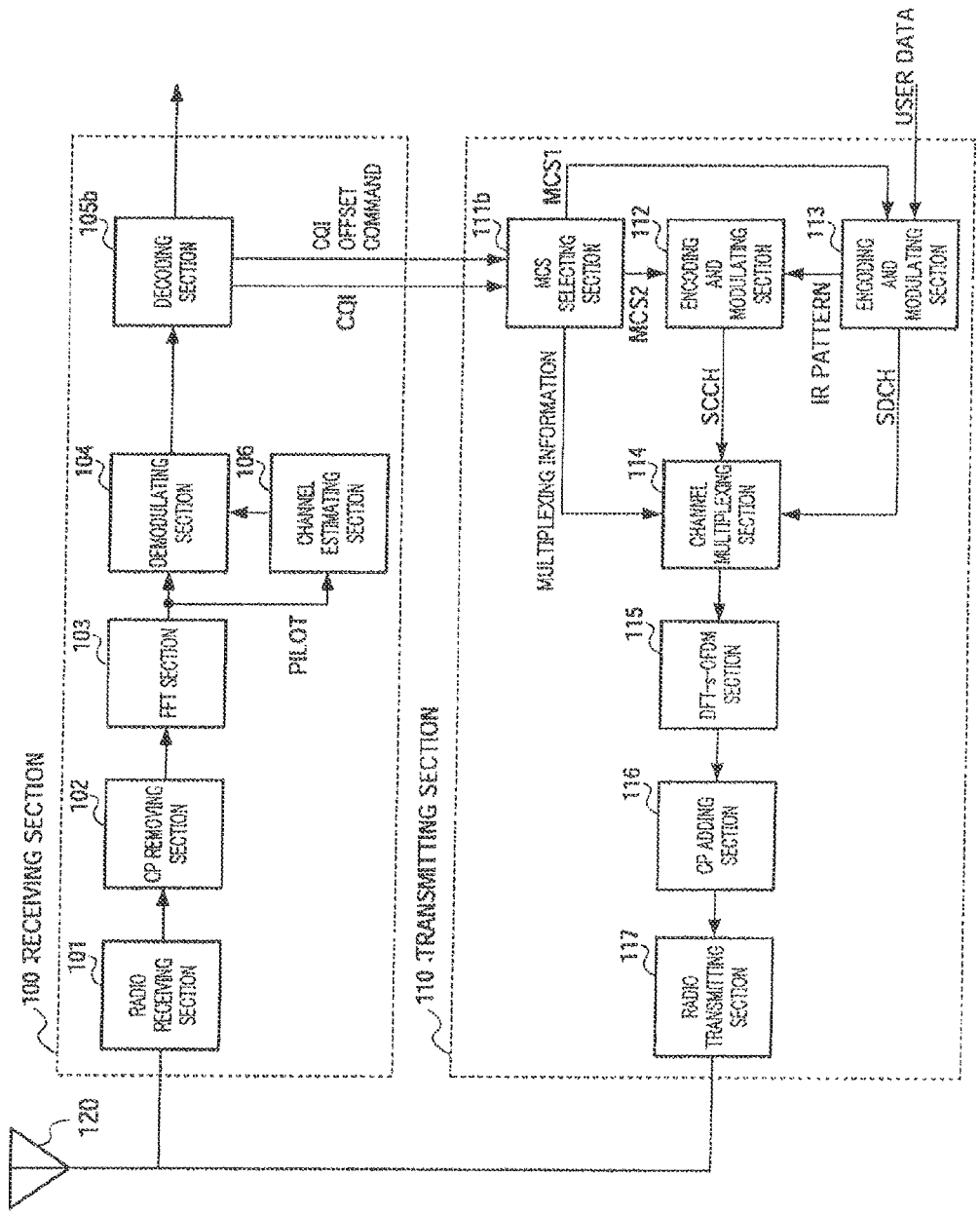
FIG. 10 is a block diagram showing a main configuration of a communication apparatus according to Embodiment 3.

FIG. 10 is a block diagram showing the main configuration of the communication apparatus provided with the radio transmitting apparatus according to Embodiment 3 of the present invention. This communication apparatus also has the basic configuration similar to the communication apparatus described in Embodiment 1, and the same components will be assigned the same reference numerals without further explanations.

The communication apparatus according to this embodiment receives a CQI and a CQI offset command and corrects the finally selected MCS for the transmission signal by correcting the CQI level for the SCCH or the SDCH. To be more specific, decoding section 105b extracts a transmitted information data sequence from a demodulated received data sequence, extracts CQI information and CQI offset command information, and outputs the extracted data sequence and information to MCS selecting section 111b.

Figure 11:
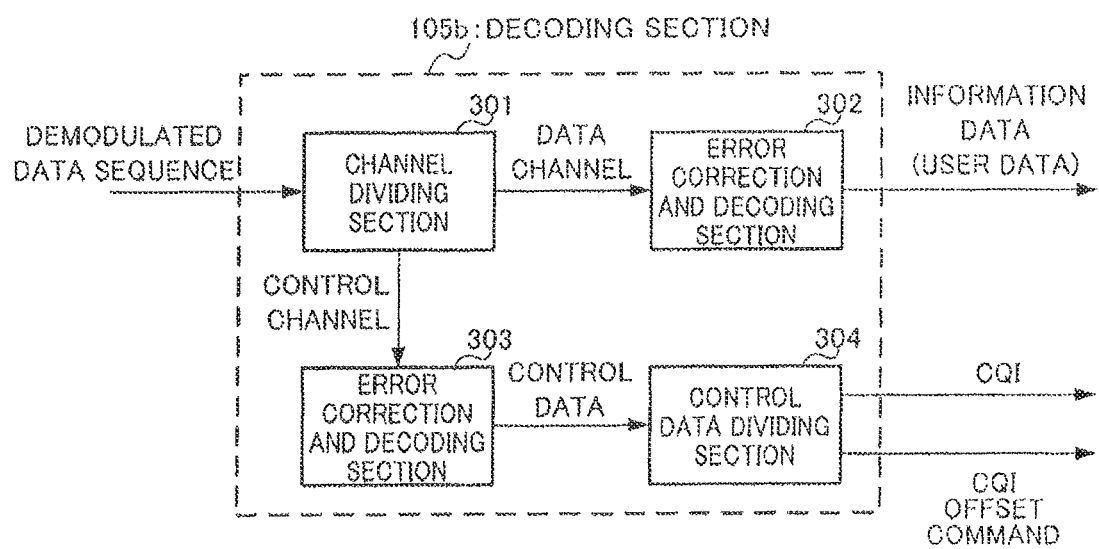
FIG. 11 is a block diagram showing a main internal configuration of a decoding section according to Embodiment 3.

FIG. 11 is a block diagram showing the main internal configuration of decoding section 105b.

Channel dividing section 301 divides the demodulated data sequence into the data channel and the control channel, and outputs these channels. Error correction and decoding section 302 performs error correction and decoding on the data channel outputted from channel dividing section 301, and outputs the obtained information data, that is, user data. On the other hand, error correction and decoding section 303 performs error correction and decoding on the control channel outputted from channel dividing section 301, and outputs the obtained control data to control data dividing section 304. Control data dividing section 304 extracts CQI information and a CQI offset command from the control channel based on predetermined control data mapping information, and outputs the extracted information and command to MCS selecting section 111b.

Figure 12:
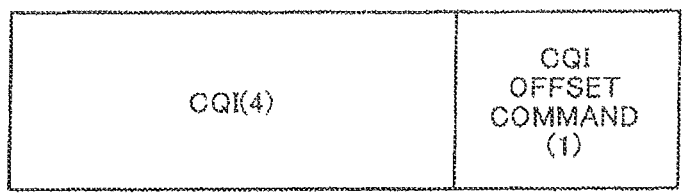
FIG. 12 shows an example of a format of a signal where CQI information and a CQI offset command are multiplexed.

FIG. 12 shows an example of a signal format where CQI information and a CQI offset command to be inputted to control data dividing section 304 are multiplexed.

Figure 13:
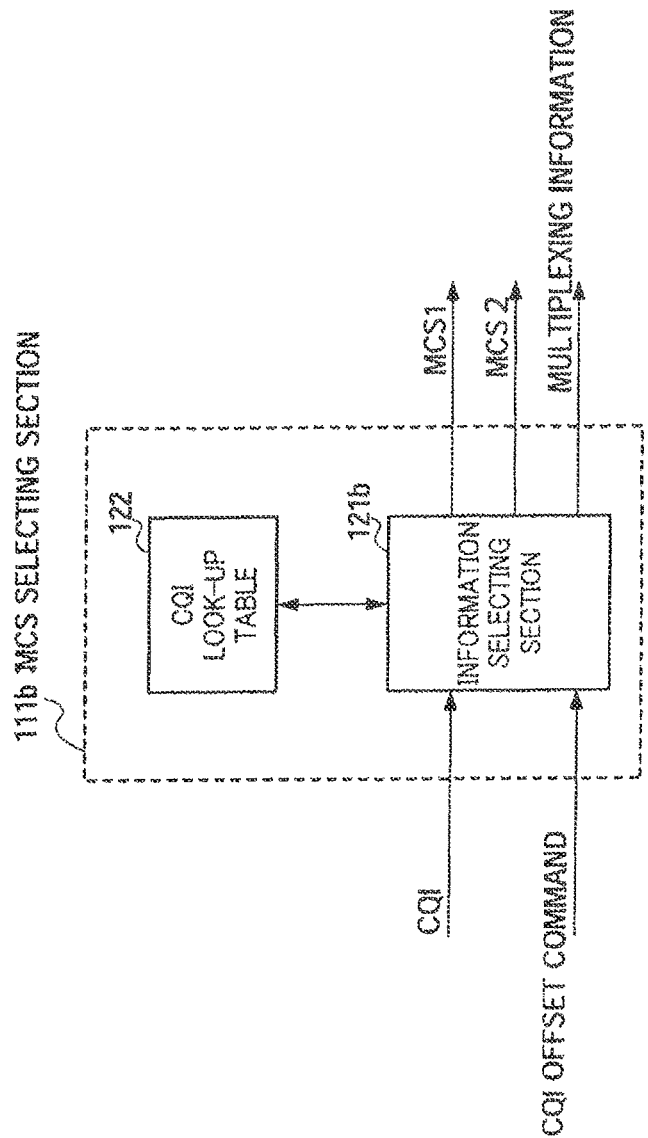
FIG. 13 is a block diagram showing a main internal configuration of an MCS selecting section according to Embodiment 3.

FIG. 13 is a block diagram showing the main internal configuration of MCS selecting section 111b.

Information selecting section 121b first determines MCS 1 for the SDCH according to the CQI information with reference to CQI look-up table 122 described in Embodiment 1. Information selecting section 121b then acquires a CQI offset command with reference to CQI look-up table 122 in the same way. This CQI offset command is specifically "−1" or "0 (no offset)." Information selecting section 121b adds this CQI offset command to the CQI information, and determines MCS 2 for the SCCH according to new corrected CQI information. The multiplexing position is determined when MCS 2 is determined, and so MCS 1, MCS 2 and multiplexing information are outputted.

When the CQI offset command is "−1," it means that the error robustness of the CQI improves by one step. In this way, by making the offset degree of the CQI one step, the required PAPR does not change. CQI look-up table 122 originally sets the MCS patterns for the SCCH and the SDCH that satisfy the required PAPR. Therefore, the required PAPR must be satisfied by selecting the MCS pattern for each channel according to this CQI table, and so, MCS patterns that go significantly outside this CQI table should not be selected. The offset degree of the CQI is made one step in order to minimize the offset degree.

FIG. 14 specifically illustrates how the CQI is actually corrected by the above-described CQI offset command. In addition, the CQI table shown here is the same as that shown in Embodiment 1 (see FIG. 5).

For example, when CQI=8 and CQI offset command=−1, QPSK, R=⅚ and RF=1 are first selected as MCS 1 for the SDCH. Next, CQI=8 in MCS 2 for the SCCH, and so CQI offset command=−1 is added, and the CQI is thereby corrected as CQI=7. Therefore, corrected MCS 2 for the SCCH includes QPSK, R=⅓ and RF=1 (diagonal part in FIG. 14), and has a coding rate with high error robustness.

In addition, the above-described CQI offset command is reported with the CQI from the radio receiving apparatus supporting the radio transmitting apparatus according to this embodiment. The method of generating a CQI offset command at the radio receiving apparatus will be described below.

Figure 15:
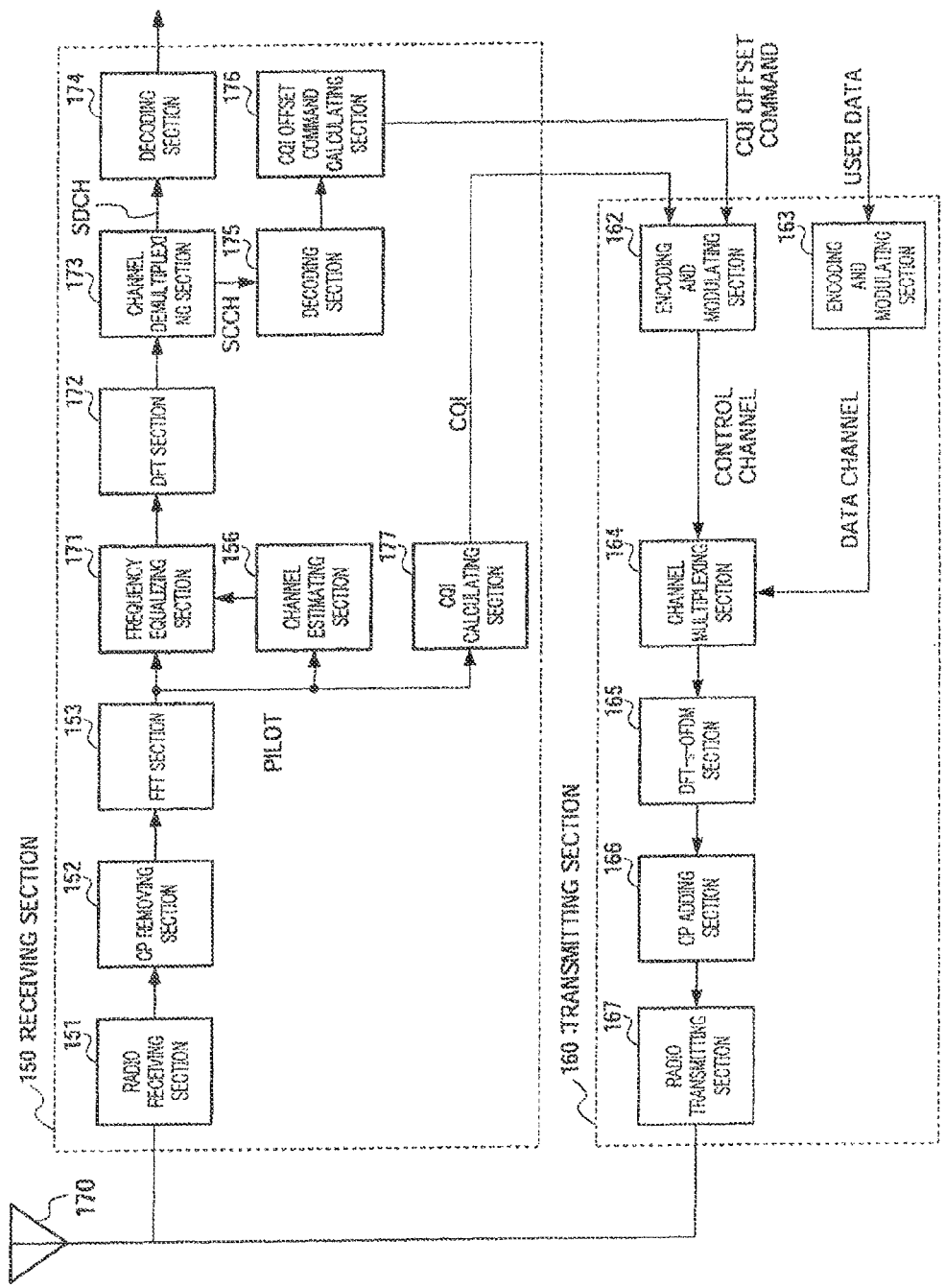
FIG. 15 is a block diagram showing a main configuration of a communication apparatus provided with a radio receiving apparatus according to Embodiment 3.

FIG. 15 is a block diagram showing the main configuration of the communication apparatus provided with the above-described radio receiving apparatus. In addition, radio receiving section 151, CP removing section 152, FFT section 153, channel estimating section 156, encoding and modulating sections 162 and 163, channel multiplexing section 164, DFT-s-OFDM section 165, CP adding section 166 and radio transmitting section 167 employ the same configuration as radio receiving section 101, CP removing section 102, FFT section 103, channel estimating section 106, encoding and modulating sections 112 and 13, channel multiplexing section 114, DFT-s-OFDM section 115, CP adding section 116 and radio transmitting section 117 of the communication apparatus described in Embodiment 1, respectively, and so the explanations thereof will be omitted.

Frequency equalizing section 171 performs frequency equalizing processing on the signal outputted from FFT section 153, and outputs the result to DFT section 172.

DFT section 172 performs discrete Fourier transform processing on the signal outputted from frequency equalizing section 171, and outputs the result to channel demultiplexing section 173.

Channel demultiplexing section 173 demultiplexes the signal outputted from DFT section 172 into an SDCH signal and an SCCH signal, outputs the SDCH signal to decoding section 174, and outputs the SCCH signal to decoding section 175.

Decoding sections 174 and 175 decode the SDCH and SCCH outputted from channel demultiplexing section 173 and outputs the results.

CQI offset command calculating section 176 calculates a CQI offset command based on a mean error rate of the received SCCH, and outputs the CQI offset command to encoding and modulating section 162 of transmitting section 160. To be more specific, when the mean error rate of the SCCH is equal to or greater than a predetermined threshold, that is, when the mean error rate of the SCCH does not satisfy the required quality, "−1" is set for the CQI offset command, and, when the mean error rate of the SCCH is less than the predetermined threshold, "0" is set for the CQI offset command.

CQI calculating section 177 calculates a CQI to report based on the received level of the received pilot signal, noise power and interference power, and outputs the CQI to encoding and modulating section 162 of transmitting section 160.

In this way, according to this embodiment, the CQI level for one of the SCCH and the SDCH is corrected based on the CQI offset command. By this means, when the required quality for one of the channels cannot be satisfied, by correcting the CQI for this channel, an MCS pattern lower than the required CNR can be used, and throughput can be improved for each channel.

Although a case has been described above as an example in this embodiment where the CQI offset command includes two values of "−1" and "0," the CQI offset command includes three values of "−1," "0" and "1" or more than three values.

Further, although an example has been described with this embodiment where the CQI offset degree is one step (when the CQI offset command is "−1"), the CQI offset degree may be two steps or more using other values such as a CQI offset command of "−2" within a range where the PAPR does not change.

Embodiments of the present invention have been described.

The radio transmitting apparatus and radio transmission method according to the present invention are not limited to the above-described embodiments, and can be implemented with various modifications. For example, the embodiments can be combined as appropriate and implemented.

The radio transmitting apparatus according to the present invention can be provided to a mobile station apparatus and base station apparatus in a mobile communication system, and it is thereby possible to provide a mobile station apparatus, base station apparatus and mobile communication system having the same operation effects as described above.

Further, the radio transmitting apparatus and radio transmission method according to the present invention can be used in the communication system employing communication schemes other than single carrier communication.

In addition, the SCCH in the above-described embodiments may be a DACCH (Data Associated Control Channel) or a DNACCH (Data Non-Associated Control Channel).

Further, although the present invention is configured with hardware as an example, the present invention can also be implemented with software. For example, the functions similar to those of the radio transmitting apparatus according to the present invention can be realized by describing an algorithm of the radio transmission method according to the present invention in a programming language, storing this program in a memory and causing an information processing section to execute the program.

Each function block used to explain the above-described embodiments may be typically implemented as an LSI constituted by an integrated circuit. These may be individual chips or may be partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSIs as a result of the development of semiconductor technology or a derivative other technology, it is naturally also possible to carry out function block integration using this technology. Application in biotechnology is also possible.

The present application is based on Japanese Patent Application No. 2005-288300, filed on Sep. 30, 2005, the entire content of which is expressly incorporated by reference herein.

INDUSTRIAL APPLICABILITY

The radio transmitting apparatus and radio transmission method according to the present invention is applicable to a mobile station apparatus, base station apparatus and the like in a mobile communication system.

The invention claimed is:

1. A communication method for use by a base station, comprising:
transmitting, to a mobile station, (i) information for determining a first coding rate, and (ii) offset information;
receiving, from the mobile station, a first type of data coded with the first coding rate that is determined by the mobile station based on the information for determining the first coding rate; and
receiving, from the mobile station, a second type of data coded with a second coding rate that is calculated by the mobile station based on (i) the information for determining the first coding rate and (ii) the offset information, the calculating the second coding rate comprising adjusting the first coding rate based on the offset information.

2. The method of claim 1 wherein the first type of data comprises user data and the second type of data comprises control information.

3. The method of claim 1 comprising using a look-up table.

4. The method of claim 1 wherein the information for determining the first coding rate and the offset information are included in a modulation and coding scheme (MCS) signal transmitted by the base station.

5. A base station, comprising:
a transmitting unit configured to transmit, to a mobile station, (i) information for determining a first coding rate, and (ii) offset information; and
a receiving unit configured to receive, from the mobile station, a first type of data coded with the first coding rate that is determined by the mobile station based on the information for determining the first coding rate, and a second type of data coded with a second coding rate that is calculated by the mobile station based on (i) the information for determining the first coding rate and (ii) the offset information, the calculating the second coding rate comprising adjusting the first coding rate based on the offset information.

6. The base station of claim 5 wherein the first type of data comprises user data and the second type of data comprises control information.

7. The base station of claim 5, comprising:
a look-up table.

8. The base station of claim 5 wherein the information for determining the first coding rate and the offset information are included in a modulation and coding scheme (MCS) signal.

9. A base station, comprising:
a transmitting unit configured to transmit information for determining a first coding rate, and offset information; and
a receiving unit configured to:
receive and decode a first type of data coded with the first coding rate; and
receive and decode a second type of data coded with a second coding rate, wherein the second coding rate is based on the first coding rate adjusted based on the offset information.

10. The base station of claim 9 wherein the first type of data comprises user data and the second type of data comprises control information.

11. The base station of claim 9, comprising:
a look-up table.

12. The base station of claim 9 wherein the information for determining the first coding rate and the offset information are included in a modulation and coding scheme (MCS) signal transmitted by the base station.

13. The base station of claim 12, comprising:
a look-up table, wherein the base station is configured to generate the MCS signal using the look-up table.

14. A non-transitory computer-readable medium whose contents configure a first communication apparatus to communicate with a second communication apparatus by performing a method, the method comprising:
transmitting, by the first communication apparatus to the second communication apparatus, information for determining a first coding rate and offset information;
decoding, by the first communication apparatus and based on the first coding rate, data of a first type received from the second communication apparatus and coded with the first coding rate; and
decoding, by the first communication apparatus and based on a second coding rate, data of a second type received from the second communication apparatus and coded with the second coding rate, wherein the second coding rate is based on the first coding rate adjusted based on the offset information.

15. The non-transitory computer-readable medium of claim 14 wherein the first type of data comprises user data and the second type of data comprises control information.

16. The non-transitory computer-readable medium of claim 14, wherein the method comprises using a look-up table.

17. The non-transitory computer-readable medium of claim 14 wherein the information for determining the first coding rate and the offset information are included in a modulation and coding scheme (MCS) signal transmitted by the first communication apparatus.

18. The non-transitory computer-readable medium of claim 17 wherein the first communication apparatus uses a look-up table to generate the MCS signal.

19. The non-transitory computer-readable medium of claim 14 wherein the first communication apparatus comprises a base station and the second communication apparatus comprises a mobile station.

* * * * *

UNITED STATES PATENT AND TRADEMARK OFFICE
CERTIFICATE OF CORRECTION

PATENT NO. : 8,923,108 B2  
APPLICATION NO. : 14/057969  
DATED : December 30, 2014  
INVENTOR(S) : Sadaki Futagi et al.

Page 1 of 1

It is certified that error appears in the above-identified patent and that said Letters Patent is hereby corrected as shown below:

On the Title Page

Item (71):  
"Panasosnic Intellectual Property Corporation of America, Torrance, CA (US)" should read,  
--Panasonic Intellectual Property Corporation of America, Torrance, CA (US)--.

Item (56):  
"JP 2004-1730193 A 6/2004" should read, --JP 2004-173019 A 6/2004--.

Signed and Sealed this  
Second Day of June, 2015

Michelle K. Lee  
*Director of the United States Patent and Trademark Office*